US012792485B2

(12) United States Patent
Lu

(10) Patent No.: US 12,792,485 B2
(45) Date of Patent: Nov. 10, 2026

(54) DATA PROCESSING METHOD, DEVICE, ELECTRONIC DEVICE, AND STORAGE MEDIUM

(71) Applicant: Lenovo (Beijing) Limited, Beijing (CN)

(72) Inventor: Ming Lu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 136 days.

(21) Appl. No.: 18/356,333

(22) Filed: Jul. 21, 2023

(65) Prior Publication Data

US 2024/0028496 A1 Jan. 25, 2024

(30) Foreign Application Priority Data

Jul. 22, 2022 (CN) ......................... 202210866806.3

(51) Int. Cl.
*G06F 11/34* (2006.01)
*G06F 11/30* (2006.01)

(52) U.S. Cl.
CPC ...... *G06F 11/3452* (2013.01); *G06F 11/3051* (2013.01)

(58) Field of Classification Search
CPC ............. G06F 11/3452; G06F 11/3051; G06F 11/3055
See application file for complete search history.

(56) References Cited

U.S. PATENT DOCUMENTS 9,026,841 B1 * 5/2015 Kim ...................... H04W 12/12 714/4.3
9,166,895 B1 * 10/2015 Sivaraman .......... G06F 11/3466
2006/0020924 A1 * 1/2006 Lo ....................... H04L 41/5009 717/124
2008/0162272 A1 * 7/2008 Huang ................ G06F 11/3409 714/E11.195
2011/0209148 A1 * 8/2011 Yamasaki ........... G06F 11/0712 718/1
2015/0347285 A1 * 12/2015 Rabin ................. G06F 11/0751 714/38.1
2015/0378730 A1 * 12/2015 Atzmon ............. G06F 11/3433 712/229
2017/0339178 A1 * 11/2017 Mahaffey ............ G06F 11/3006
2018/0150373 A1 * 5/2018 Vallone ............... G06F 11/3409
2021/0064388 A1 * 3/2021 Gardner ................... G06N 3/09

* cited by examiner

*Primary Examiner* — Ashish Thomas
*Assistant Examiner* — Bryan P Huang
(74) *Attorney, Agent, or Firm* — IANOVA LAW GROUP, PLLC

(57) ABSTRACT

A data processing method includes responding to a first application satisfying a first condition to obtain data in a first monitoring time window, determining a standard deviation of data in at least two sub-time windows included in the first monitoring time window, and based on the standard deviation of the data in the at least two sub-time windows and/or variation information of the data in the first monitoring time window, determining a status of the first application.

17 Claims, 4 Drawing Sheets

DATA PROCESSING METHOD, DEVICE, ELECTRONIC DEVICE, AND STORAGE MEDIUM

CROSS-REFERENCE TO RELATED APPLICATION

The present disclosure claims priority to Chinese Patent Application No. 202210866806.3, filed on Jul. 22, 2022, the entire content of which is incorporated herein by reference.

TECHNICAL FIELD

The present disclosure relates to the computer technology field and, more particularly, to a data processing method, a device, an electronic device, and a storage medium.

BACKGROUND

Before the official launch of an application, a number of services and nodes need to be restarted multiple times. Each restart of the service and node triggers system alerts. In the existing technology, monitoring is turned off to reduce system alerts. After the official launch of the application, the monitoring is reactivated. However, if the application is already online but monitoring is not activated, risks are imposed on business operations.

SUMMARY

Embodiments of the present disclosure provide a data processing method. The method includes responding to a first application satisfying a first condition to obtain data in a first monitoring time window, determining a standard deviation of data in at least two sub-time windows included in the first monitoring time window, and based on the standard deviation of the data in the at least two sub-time windows and/or variation information of the data in the first monitoring time window, determining a status of the first application.

Embodiments of the present disclosure provide a data processing device, including an acquisition unit, a processing unit, and a status determination unit. The acquisition unit is configured to respond to a first application satisfying a first condition to obtain data in a first monitoring time window. The processing unit is configured to determine a standard deviation of data in at least two sub-time windows included in the first monitoring time window. The status determination unit is configured to, based on the standard deviation of the data in the at least two sub-time windows and/or variation information of the data in the first monitoring time window, determine a status of the first application.

Embodiments of the present disclosure provide an electronic device including one or more memories and one or more processors. The one or more memories are communicatively connected to the one or more processors and store instructions that, when executed by the one or more processors, cause the one or more processors to respond to a first application satisfying a first condition to obtain data in a first monitoring time window, determine a standard deviation of data in at least two sub-time windows included in the first monitoring time window, and based on the standard deviation of the data in the at least two sub-time windows and/or variation information of the data in the first monitoring time window, determine a status of the first application.

DETAILED DESCRIPTION OF THE EMBODIMENTS

To cause the purpose, features, and advantages of the present disclosure to be more obvious and understandable, the technical solutions of embodiments of the present disclosure are described in detail below in connection with the accompanying drawings of embodiments of the present disclosure. Described embodiments are only some embodiments of the present disclosure and not all embodiments. All other embodiments obtained by those skilled in the art based on embodiments in the present disclosure without creative efforts should be within the scope of the present disclosure.

During the process of applying for cloud resources and deploying an application to the cloud, a service and a node need to be restarted a plurality of times, which can cause system alerts or a management ticket of IT service management (ITSM) may be issued for a user. Operations may need to be performed frequently to turn off the system alerts and the ticket. In many ITSM management processes, with a certain number of tickets or the tickets being not closed in time, the performance of an operation maintenance engineer or a department where the operation maintenance engineer belongs can be affected.

Thus, many operation maintenance engineers may turn off monitoring at an early stage of deployment and launch of the system or set a relatively large maintenance window. After the system and application operate normally, a configuration or a monitoring status can be adjusted to a working status. As such, the alerts can be reduced, and the operation maintenance operations can be simplified. However, if a node operates online, and the alert system cannot operate normally, a risk can be imposed on the business operation.

To address the problem existing in the process of launching the application, the present disclosure provides a data processing method, a device, an electronic device, and a storage medium. A key observation indicator range can be set for a monitoring object (application or first application below). If a standard deviation of an indicator combination or certain key indicators exceeds a threshold in a certain period of time, and the time of the standard deviation exceeding the threshold exceeds a certain threshold or standard deviations of different time windows have a certain periodical feature, the monitoring object may have transitioned from a deployment status to the working status. Thus, a notification can be triggered to determine whether a monitoring configuration corresponding to the node needs to be adjusted. Whether a wave shape of a related configuration item of a server corresponding to the monitoring object has a relatively large fluctuation can be identified to determine whether the monitoring object has transitioned to online operation not only in the application deployment stage to solve a part of or all the technical problems.

Figure 1:
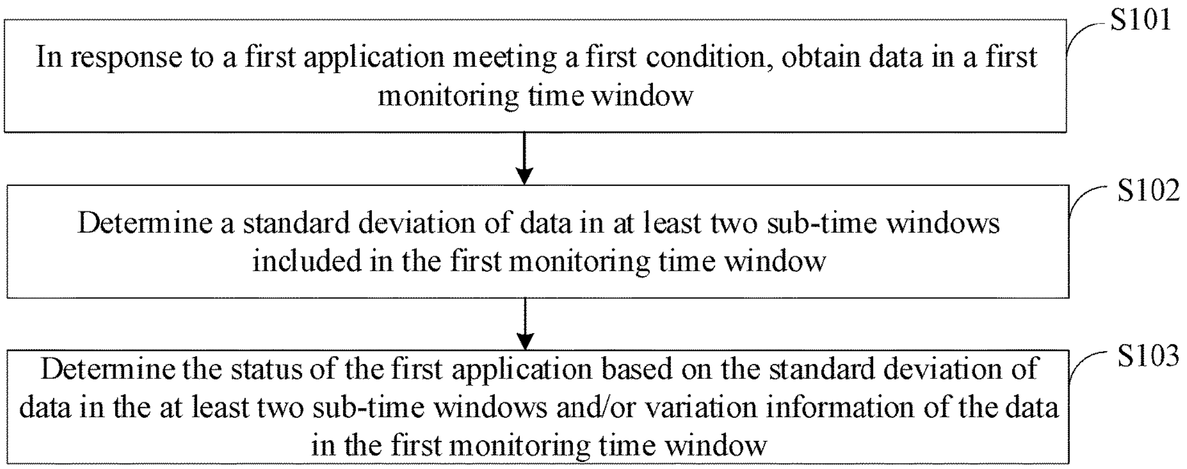
FIG. 1 illustrates a schematic flowchart of a data processing method according to some embodiments of the present disclosure.

FIG. 1 illustrates a schematic flowchart of a data processing method according to some embodiments of the present disclosure.

At S101, in response to a first application meeting a first condition, data in a first monitoring time window is obtained.

In some embodiments, the first condition can include a first sub-condition and a second sub-condition. A data processing device (i.e., device) responding to the first application meeting the first condition can include the device responding that the first application meets the first sub-condition included by the first condition, and the first application meets the second sub-condition included in the first condition.

In some embodiments, in response to meeting that a delivery time of a resource corresponding to the first application in a delivery database is after a first time, an application time of the resource corresponding to the first application in a cloud platform is after a second time, a time of creating the resource corresponding to the first application in the cloud platform is after a third time, and a time of generating the resource corresponding to the first application in the cloud platform is after a fourth time, the device can determine that the first application meets the first sub-condition. That is, the first sub-condition can represent that the resource or data of the first application are not delivered.

In some embodiments, in response to a current status of the first application being an online deployment status, the device can determine that the first application meets the second sub-condition. That is, the resource or data of the first application are not delivered, and the status can be the online deployment status. Then, the data processing method of the present disclosure can be performed. Further, the data processing method of embodiments of the present disclosure can be suitable for the application with the resource or data that is not delivered and in the online deployment status.

In some embodiments, the first condition can further include a third sub-condition. The third sub-condition includes that a monitoring system corresponding to the first application is not activated. The data processing method of embodiments of the present disclosure is provided to avoid the risk generated when the monitoring system is not activated in time after the official launch of the first application because the monitoring system is turned off due to certain reasons (e.g., too many alerts, performance impact by tickets) in the process of online deployment. If the monitoring system corresponding to the first application has been activated in the process of online deployment, the monitoring system can be still in the activated status after the first application is online, and the data processing method of embodiments of the present disclosure may not need to be performed.

In some embodiments, the device can be configured to determine a starting point and an ending point of the first monitoring time window corresponding to the first application and obtain CPU utilization data and/or memory utilization data between the starting point and the ending point.

At S102, a standard deviation of data in at least two sub-time windows included in the first monitoring time window is determined.

In some embodiments, the device can be configured to divide the first monitoring time window into at least two sub-time windows with an equal time length and determine the standard deviation of the CPU utilization data and/or memory utilization data in each sub-time window.

In some embodiments, the device can be configured to determine the standard deviation of the CPU utilization data and/or the memory utilization data in each sub-time window or determine the standard deviation of the CPU utilization data and/or the standard deviation of the memory utilization data based on the CPU utilization data and/or memory utilization data in each sub-time window.

At S103, the status of the first application is determined based on the standard deviation of data in the at least two sub-time windows and/or variation information of the data in the first monitoring time window.

In some embodiments, the device can be configured to determine that the status of the first application is the online status in response to at least one of the standard deviation of the utilization data of the CPU and/or the standard deviation of the utilization data of the memory in each sub-time window being greater than a first threshold or the data in the first monitoring time window changing periodically.

In some embodiments, after the device determines that the status of the first application is an online status, the device can further issue warning information. The warning information can be used to indicate to open the monitoring system corresponding to the first application.

Thus, with the data processing method of embodiments of the present disclosure, the data in the first monitoring time window can be obtained in response to the first application meeting the first condition, the data in the first monitoring time window can be obtained in response to the first application meeting the first condition, the standard deviation of the data in the at least two sub-time windows included in the first monitoring time window can be determined, and the status of the first application can be determined based on the standard deviation of the data in the at least two sub-time windows and/or the variation information of the data in the first monitoring time window. Thus, the variation of the status of the first application can be monitored in time, the monitoring system can be activated in time, and the risk imposed on the business operation can be reduced.

Thus, with the data processing method of embodiments of the present disclosure, the data in the first monitoring time window can be obtained in response to the first application meeting the first condition, the standard deviation of the data in the at least two sub-time windows included in the first monitoring time window can be determined, the status of the first application can be determined based on the standard deviation of the data in the at least two sub-time windows and/or the responding to the first application meeting the first condition and obtaining data from the first monitoring time window, confirming the standard deviation of the data from at least two sub-time windows included in the first monitoring time window, and determining the state of the first application based on the standard deviation of the data from at least two sub-time windows and/or the variation information of the data in the first monitoring time window, it is possible to monitor the changes in the state of the first application in a timely manner, start the monitoring system promptly, and reduce the risks associated with business operations.

Figure 2:
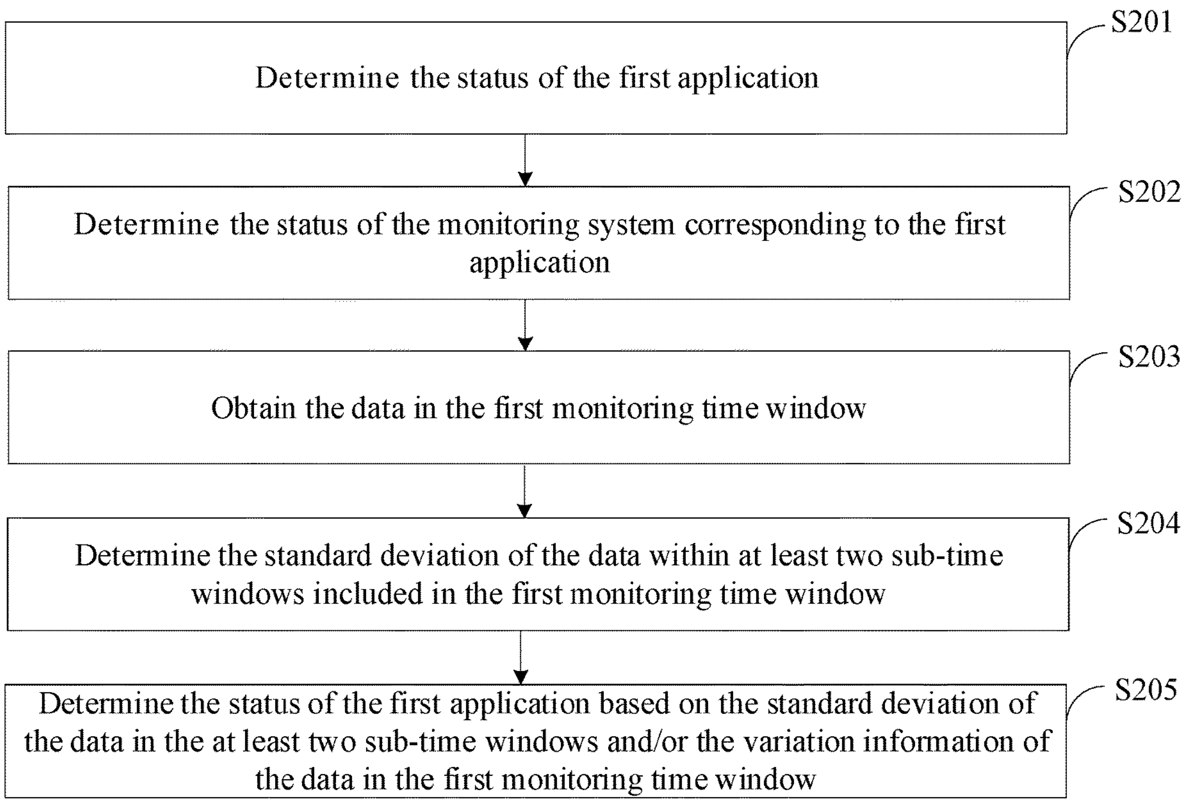
FIG. 2 illustrates a schematic flowchart of another data processing method according to some embodiments of the present disclosure.
Figure 3:
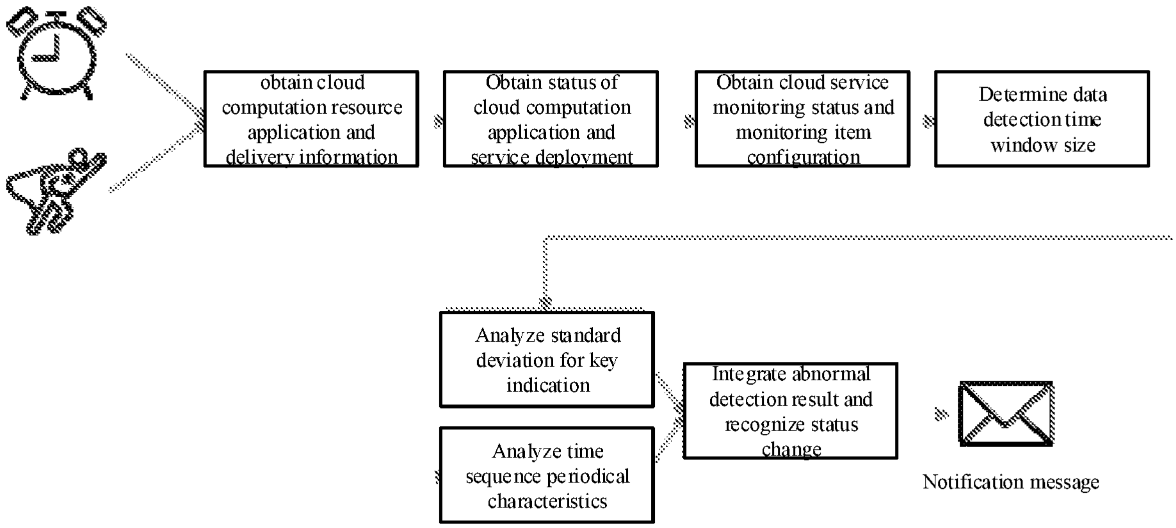
FIG. 3 illustrates a schematic block diagram of a data processing method according to some embodiments of the present disclosure.

FIG. 2 illustrates a schematic flowchart of another data processing method according to some embodiments of the present disclosure. FIG. 3 illustrates a schematic block diagram of a data processing method according to some embodiments of the present disclosure.

At S201, the status of the first application is determined.

In some embodiments, steps S201 to S205 can be triggered by a scheduling program or instructions.

In some embodiments, as shown in FIG. 3, the device obtains cloud computation resource application and delivery information based on relevant resources such as the cloud platform, ITSM, DevOps, or delivery system. Based on the cloud computation resource application and delivery information, whether the first application satisfies the first sub-condition included in the first condition can be determined.

In some embodiments, the resource for applying for a cloud computating environment and starting deployment can be obtained from some databases, e.g., a business internal delivery database, or resource application and creation time and resource generation time of the cloud platform. For example, a certain service applied through an internal work order can be found from the internal delivery data. The delivery data can be stored in a cloud computation management platform, a configuration management database (CMDB), or the ITSM. If the cloud is public, creation time of the virtual server or a certain service can be seen from a Web API.

In some embodiments, the device can be configured to determine that the first application meets the first sub-condition in response to meeting at least one of the delivery time of the resource corresponding to the first application in the delivery database being after the first time, the application time of the resource corresponding to the first application in the cloud platform being after the second time, the time of the resource corresponding to the first application created in the cloud platform being after the third time, or the resource corresponding to the first application generated in the cloud platform being after the fourth time. That is, the first sub-condition can represent that the resource or the data of the first application is not delivered.

In addition, if the resource delivery is determined to be a basis on the cloud computing resource application and delivery information that the resource delivery is a horizontal expansion of a cluster environment, e.g., the cloud platform horizontally expanding as the load varies, the first application is determined to not meet the first sub-condition.

In some embodiments, as shown in FIG. 3, the device is configured to obtain a working status of the cloud computation application and service corresponding to the first application, and determine whether the first application satisfies the second sub-condition included in the first condition. The working status can include an online working status, an online deployment status, and an about-to-be offline status. For the service that is in the online working status, the data processing method of embodiments of the present disclosure may not need to be performed. Only for the cloud computation application and service in the online deployment status, the data processing method of embodiments of the present disclosure may need to be performed.

In some embodiments, the device can be configured to determine that the first application satisfies the second sub-condition in response to the current status of the first application being the online deployment status. That is, the resource or the data of the first application is not delivered and the status of the resource or the data of the first application is the online deployment status. Thus, the data processing method of the present disclosure can be performed. Further, the data processing method of embodiments of the present disclosure can be suitable for an application with the resource or data that are not delivered and in the online deployment status.

At S202, the status of the monitoring system corresponding to the first application is determined.

In some embodiments, the first condition can further include a third sub-condition. The third sub-condition includes that the monitoring system corresponding to the first application is not activated. With the data processing method of embodiments of the present disclosure, the risk generated due to the monitoring system being not activated in time after the first application is officially launched can be avoided when the monitoring system is t because of certain reasons (e.g., too many alerts, performance impact by work orders) during the process of the online deployment of the first application. If the monitoring system corresponding to the first application is activated in the online deployment process, the monitoring system is still activated after the first application is online, and the data process method of embodiments of the present disclosure may not need to be performed.

In some embodiments, as shown in FIG. 3, the device is configured to obtain a cloud service monitoring status and a monitoring item setting. In some embodiments, the device is configured to determine whether the monitoring item corresponding to the first application is activated, whether the monitoring system is activated, whether the monitoring threshold and the operation environment configuration are the same when the monitoring item or the monitoring system is activated. If the monitoring item is activated, the monitoring system is activated, or the monitoring system is activated and the monitoring threshold and the operation environment configuration are the same, the data processing method of embodiments of the present disclosure may not be performed, or the monitoring item or the monitoring system can be set to a maintenance window to no longer send the alert to continue to perform the data processing method of the present disclosure.

In some embodiments, the device can be configured to determine that the first application meets the third sub-condition included in the first condition in response to at least one of the monitoring item corresponding to the first application being not activated, the monitoring system corresponding to the first application being not activated, or the monitoring item or the monitoring system being activated but the monitoring threshold and the operation environment configuration being not the same.

In some embodiments, the device can be configured to obtain such type of data information by matching the data of the database corresponding to the monitoring system and the cloud computing environment.

At S203, the data in the first monitoring time window is obtained.

In some embodiments, the device can be configured to determine the starting point and the ending point (i.e., a size of a data detection time window determined in FIG. 3) of the first monitoring time window corresponding to the first application, obtain the utilization data of the CPU and/or the utilization data of the memory corresponding to the first application between the starting point and the ending point.

In some embodiments, the device can be configured to determine the starting point and the ending point of the first monitoring time window corresponding to the first application based on the actual needs or an experimental result.

In some embodiments, if an accumulated time of the monitoring data (CPU utilization data and/or memory utilization data) is too short, or a certain degree of data is lost (i.e., unstable access to the monitoring system), the data processing method of the present disclosure may not need to be performed. If the delivery time of the cloud computation resource is relatively long, and the system does not enter the official operation, the data can be obtained according to a longest set length of the time window. Based on the above, the total time length of historical monitoring data that needs to be analyzed can be determined.

In some embodiments, the device can be configured to divide the first monitoring time window into at least two sub-time windows having an equal time length. In some embodiments, the device can be configured to divide the first monitoring time window into several independent small time windows (sub-time windows) according to a preset parameter or manual labeling. The device can be configured to calculate and store the standard deviation of the monitoring data within different sub-time windows.

At S204, the standard deviation of the data within at least two sub-time windows included in the first monitoring time window is determined.

In some embodiments, the device can be configured to divide the first monitoring time window into at least two sub-time windows having an equal time length and determine the standard deviation of the CPU utilization data and/or memory utilization data in each sub-time window.

In some embodiments, as shown in FIG. 3, the device is configured to determine the standard deviation of the CPU utilization data and/or the memory utilization data in each sub-time window (i.e., analyze the standard deviation of the key performance indicators), or determine the standard deviation of the CPU utilization data and/or the standard deviation of the memory utilization data in each sub-time window based on the CPU utilization data and/or the memory utilization data in each sub-time window.

At S205, the status of the first application is determined based on the standard deviation of the data in the at least two sub-time windows and/or the variation information of the data in the first monitoring time window.

In some embodiments, the device can be configured to determine the status of the first application to be the online status in response to at least one of the standard deviation of the CPU utilization data and/or the memory utilization data of each sub-time window being greater than a first threshold, or the data of the first monitoring time window changing periodically. If the first application operates online, the data can fluctuate. The standard deviation of the data in the sub-time window can be smaller than the standard deviation during the process of online deployment (offline with smaller data fluctuation).

Furthermore, as shown in FIG. 3, standard deviation analysis is performed on the standard deviation. If the standard deviation of the recent data (obtained within a period of time) is significantly greater than the historical standard deviation (the first threshold) (performing standard deviation analysis), the indicator is indicated by a recent load. The status of the first application can be determined to be the online status.

In some embodiments, a periodic check is performed on the data in the sub-time windows. If significant periodic features exist, especially in a range close to the current time, for example, an obvious periodic feature exists in the latest 50% time period, the indicator can be indicated of the load change. The status of the first application can be determined to be the online status. For example, an active time of the application corresponding to the email and office software can be office hours, the period can be 24 hours. The period of financial monthly statement period can be one month.

In some embodiments, performing the periodic check on the data in the sub-time windows can include performing the periodic check on the data in the time window formed by one or more continuous sub-time windows. That is, the periodic check can be performed on time windows with different lengths. If a time window of any length has an obvious periodic feature, the indicator can be indicated by a recent sending load change. For example, the daily workload increases, and the load at the end of the month can be even greater. Each day can correspond to a sub-time window. In each sub-time window, the application can be active during office hours, and the period can be 24 hours. A new time window formed by 28 to 31 continuous sub-time windows can have a period of one month.

In the present disclosure, the periodic check is introduced, because the status of the first application is often the online status, but the standard deviation is not greater than the first threshold. The status of the first application can be accurately determined according to the periodic change.

In some embodiments, after the device determines that the status of the first application is the online status, the device can also send alert information. The alert information can be used to indicate the activation of the monitoring system corresponding to the first application.

Thus, in the data processing method of the present disclosure, a focus observation indicator range can be set for the monitoring object (the first application). If the standard deviation of the indicator combination of a certain period or certain key indicators exceeds a certain threshold, and a lasting time exceeds a certain threshold or the standard deviations of different time windows have a certain periodic feature, the monitoring object can transition from the deployment status into the working status. Thus, the notification can be triggered to determine whether the monitoring configuration corresponding to the node needs to be adjusted.

Figure 4:
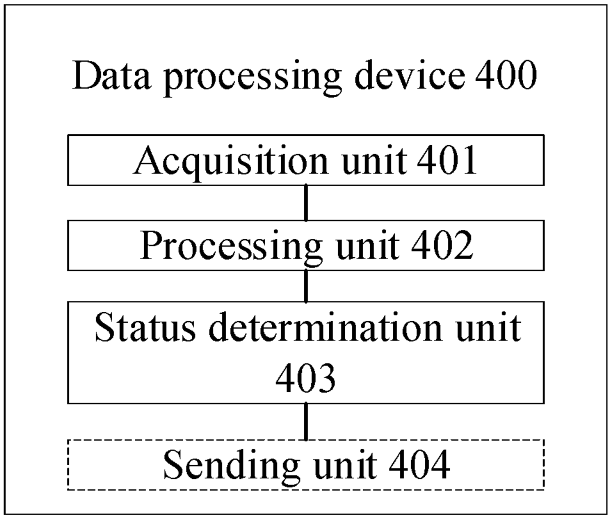
FIG. 4 illustrates a schematic structural diagram of a data processing device according to some embodiments of the present disclosure.

FIG. 4 illustrates a schematic structural diagram of a data processing device 400 according to some embodiments of the present disclosure.

In some embodiments, the data processing device 400 includes an acquisition unit 401, a processing unit 402, and a status determination unit 403.

The acquisition unit 401 can be configured to obtain the data in the first monitoring time window in response to the first application meeting the first condition.

The processing unit 402 can be configured to determine the standard deviation of the data in the at least two sub-time windows included in the first monitoring time window.

The status determination unit 403 can be configured to determine the status of the first application based on the standard deviation of the data in the at least two sub-time windows and/or the variation information of the data in the first monitoring time window.

In some embodiments, the acquisition unit 401 can be configured to respond to the first application meeting the first sub-condition included in the first condition and the first application meeting the second sub-condition included in the first condition.

In some embodiments, the acquisition unit 401 can be configured to determine the first application meeting the first sub-condition in response to at least one of the delivery time of the resource corresponding to the first application in the delivery database being after the first time, the application time of the resource corresponding to the first application in the cloud platform being after the second time, the time of creating the resource corresponding to the first application in the cloud platform being after the third time, or the time of generating the resource corresponding to the first application in the cloud platform being after the fourth time.

In some embodiments, the acquisition unit 401 can be configured to determine the first application meeting the second sub-condition in response to the current status of the first application being in the online deployment status.

In some embodiments, the acquisition unit 401 can be configured to determine the starting point and the ending point of the first monitoring time window and obtain the CPU utilization data and/or memory utilization data between the starting point and the ending point.

In some embodiments, the processing unit 402 can be configured to divide the first monitoring time window into at least two sub-time windows of the equal time length and determine the standard deviation of the CPU utilization data and/or memory utilization data in each sub-time window.

In some embodiments, the status determination unit 403 can be configured to determine the status of the first application to be the online status in response to at least one of the standard deviation of the CPU utilization data and/or the memory utilization data in each sub-time window being greater than the first threshold or the data in the first monitoring time window periodically changing.

In some embodiments, the data processing device 400 can further include a sending unit 404.

The sending unit 404 can be configured to send warning information after the status of the first application is determined to be the online status. The warning information can be used to indicate to activate the monitoring system corresponding to the first application.

According to embodiments of the present disclosure, the present disclosure further provides an electronic device and a readable storage medium.

Figure 5:
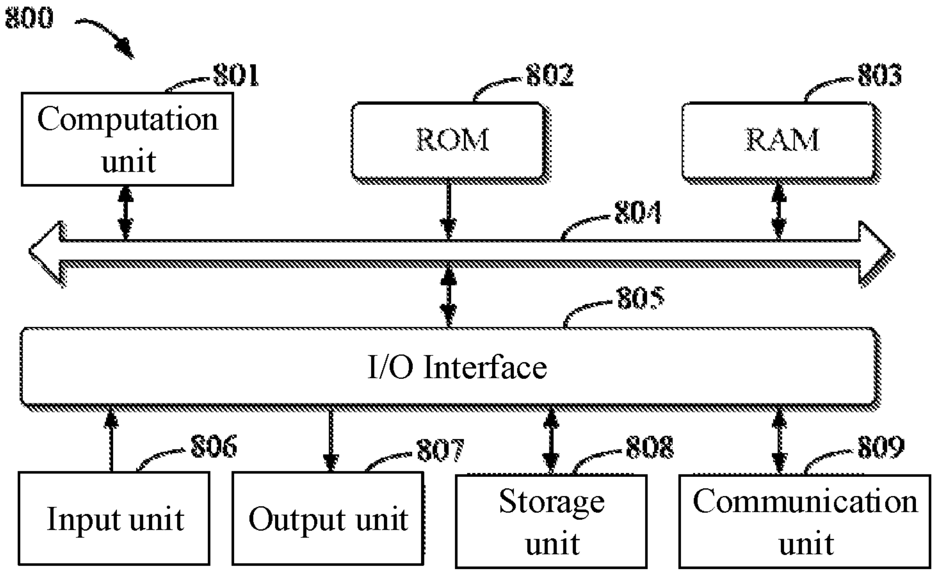
FIG. 5 illustrates a schematic structural diagram of an electronic device according to some embodiments of the present disclosure.

FIG. 5 illustrates a schematic structural diagram of an electronic device 800 according to some embodiments of the present disclosure. The electronic device 800 is intended to represent various forms of digital computers such as laptops, desktops, workstations, personal digital assistants, servers, blade servers, mainframes, and other suitable computation machines. The electronic device can also represent various forms of mobile devices such as personal digital assistants, cellular phones, smartphones, wearable devices, and other similar computation devices. The components, connections and relationships thereof, and functions thereof of the present disclosure are merely used as examples, which are not intended to limit embodiments of the present disclosure.

As shown in FIG. 5, the electronic device 800 includes a computation unit 801, which performs various appropriate actions and processes according to the computer programs stored in a read-only memory (ROM) 802 or the computer programs loaded from a storage unit 808 into a random-access memory (RAM) 803. Various programs and data required for operating the electronic device 800 can also be stored in the RAM 803. The computation unit 801, the ROM 802, and the RAM 803 are interconnected via a bus 804. An input/output (I/O) interface 805 is also connected to the bus 804.

A plurality of components of the electronic device 800 are connected to the I/O interface 805, including an input unit 806 such as a keyboard, mouse, etc., an output unit 807 such as various types of displays, speakers, etc., a storage unit 808 such as a disk, CD, etc., and a communication unit 809 such as a network card, modem, wireless communication transceiver, etc. The communication unit 809 can be configured to enable the electronic device 800 to exchange information/data with other apparatuses via computer networks such as the Internet and/or various telecommunications networks.

The computation unit 801 can be a general-purpose and/or special-purpose processing assembly with processing and computation capabilities. In some embodiments, the computation unit 801 can include but is not limited to a central processing unit (CPU), a graphics processing unit (GPU), various special-purpose artificial intelligence (AI) computation chips, a computation unit for running machine learning model algorithms, a digital signal processor (DSP), and any suitable processors, controllers, microcontrollers, etc. The computation unit 801 can be configured to perform the methods and processes above. For example, in some embodiments, the data processing method can be implemented as a computer software program that is tangibly included in a computer-readable medium, such as the storage unit 808. In some embodiments, all or a part of the computer program can be loaded and/or installed on the electronic device 800 via the ROM 802 and/or the communication unit 809. When the computer program is loaded into the RAM 803 and performed by the computation unit 801, one or more steps of the data processing method can be performed. In some embodiments, the computation unit 801 can be configured to perform the data processing method in any other suitable manner (e.g., via firmware).

A functional unit or module as described in the present application implemented as a computer software program that is tangibly included in a computer-readable medium, such as the storage unit 808. When the computer program is loaded into the RAM 803 and performed by the computation unit 801, the functional steps of the unit or module can be performed. In some embodiments, a functional unit or module may also be implemented by a combination of software and hardware components.

The system and technologies of various embodiments of the present disclosure can be implemented in a digital electronic circuit system, an integrated circuit system, a field-programmable gate array (FPGA), an application-specific integrated circuit (ASIC), an application-specific standard product (ASSP), a system-on-chip (SoC) system, a complex programmable logic device (CPLD), computer hardware, firmware, software, and/or a combination thereof. The various embodiments can be implemented in one or more computer programs that can be executed and/or interpreted on a programmable system including at least one programmable processor. The programmable processor can be a special-purpose or general-purpose programmable processor. The programmable processor can receive data and instructions from a storage system, at least one input device, and at least one output device, and transfer the data and the instructions to the storage system, the at least one input device, and the at least one output device.

Program codes for implementing the method of the present disclosure can be written in any combination of one or more programming languages. The program codes can be provided to a processor or a controller of a general-purpose computer, a dedicated computer, or another programmable data processing device that, when executed by the processor or the controller, cause the processor or the controller to perform the functions/operations specified in the flowchart and/or block diagram. The program codes can be completely or partially executed on a machine, or partially executed on the machine and partially executed in a remote machine or completely executed in the remote machine or server as an independent software packet.

In the context of the present disclosure, a computer-readable medium can be a tangible medium including or storing a program for use by an instruction execution system, device, or apparatus or in connection with the instruction execution system, device, or apparatus. The computer-readable medium can be a computer-readable signal medium or a computer-readable storage medium. The computer-readable medium can include, but is not limited to, an electronic, magnetic, optical, electromagnetic, infrared, or semiconductor system, apparatus, or device, or any suitable combination thereof. In some embodiments, the computer-readable storage medium can include an electrical connection based on one or more wires, a portable computer disk, a hard drive, a random-access memory (RAM), a read-only memory (ROM), an erasable programmable read-only memory (EPROM or flash memory), optical fibers, a compact disc read-only memory (CD-ROM), an optical storage device, a magnetic storage device, or any suitable combination thereof.

To provide interaction with the user, the system and technology of embodiments of the present disclosure can be implemented on a computer. The computer includes a display device (e.g., a CRT or LCD monitor) configured to display information to the user, a keyboard, and a pointing device (e.g., a mouse or trackball). The user can provide input to the computer through the keyboard and the pointing device. Another type of device can be further configured to provide the interaction with the user. For example, feedback provided to the user can include any type of sensory feedback (e.g., visual feedback, auditory feedback, or tactile feedback), and an input from the user can be received in any form, including a voice input, an audio input, or a tactile input.

The system and technology described herein can be implemented in a computation system including a backend component (e.g., as a data server), a computation system including a middleware component (e.g., an application server), a computation system including a frontend component (e.g., a user computer with a graphical user interface or web browser through which the user can interact with system and technology embodiments described herein), or a computation system including any combination of the backend component, the middleware component, and the frontend component. The components of the system can be interconnected through digital data communication in any form or medium (e.g., communication networks). An example of the communication networks includes a local area network (LAN), a wide area network (WAN), and the internet.

A computer system can include a client terminal and a server. The client terminal and the server are typically located away from each other and interact with each other through a communication network. A client-server relationship can be generated by running computer programs having the client-server relationship on corresponding computers. The server can be a cloud server, a server of a distributed system, or a server combined with blockchain.

The various forms of processes shown above can be used to rearrange, add, or delete steps. For example, the steps of the present disclosure can be performed in parallel, in sequence, or in a different order, as long as the desired result of the technical solution of the present disclosure can be achieved, which is not limited in the present disclosure.

Furthermore, the terms "first" and "second" are only used for description purposes and should not be construed as indicating or implying relative importance or a specific quantity of the indicated technical features. Thus, a feature decorated by "first" or "second" may explicitly or implicitly include at least one of the features. In the description of the present disclosure, the term "a plurality of" means two or more unless otherwise specified.

The above are merely some embodiments of the present disclosure. However, the scope of the present disclosure is not limited to this. Those skilled in the art can easily think of modifications or replacements, and these modifications and replacements should be within the scope of the present disclosure. Thus, the scope of the present invention should be subjected to the scope of the claims.

What is claimed is:

1. A data processing method comprising:

determining whether a first application deployed in a cloud platform satisfies a first condition, wherein the determining whether the first application satisfies the first condition includes: determining whether the first application satisfies a first sub-condition included in the first condition and a second sub-condition included in the first condition, the first sub-condition being indicative of a resource or a first data of the first application in the cloud platform not having been delivered;

determining whether a monitoring system corresponding to the first application is activated;

in response to the first application satisfying the first condition and the monitoring system corresponding to the first application being not activated, obtaining central processing unit utilization data and/or memory utilization data, of a server corresponding to the first application in the cloud platform, within a first monitoring time window;

determining a standard deviation of data in at least two sub-time windows included in the first monitoring time window;

based on the standard deviation of the central processing unit utilization data and/or the memory utilization data in the at least two sub-time windows and/or variation information of the central processing unit utilization data and/or the memory utilization data in the first monitoring time window, determining whether a status of the first application is an online status, wherein the status of the first application is determined as being the online status in response to the central processing unit utilization data and/or the memory utilization data in the first monitoring time window changing periodically based on a period, the period being associated with an application type of the first application; and in response to the status of the first application being the online status, sending warning information, the warning information prompting activation of the monitoring system corresponding to the first application.

2. The method according to claim 1, wherein the first application is determined as satisfying the first sub-condition included in the first condition in response to the first application satisfying at least one of: a delivery time of the resource corresponding to the first application in a delivery database being after a first moment, an application time of the resource corresponding to the first application in a cloud platform being after a second moment, a time of creating the resource corresponding to the first application in the cloud platform being after a third moment, or a time of generating the resource corresponding to the first application in the cloud platform being after a fourth moment.

3. The method according to claim 1, wherein the first application is determined as satisfying the second sub-condition included in the first condition in response to a current status of the first application being an online deployment status.

4. The method according to claim 1, wherein obtaining the data in the first monitoring time window includes:

determining a starting point and an ending point of the first monitoring time window; and obtaining central processing unit (CPU) utilization data and/or memory utilization data between the starting point and the ending point.

5. The method according to claim 1, wherein determining the standard deviation of the data in at least two sub-time windows included in the first monitoring time window includes:

dividing the first monitoring time window into at least two sub-time windows of an equal length; and determining a standard deviation of CPU utilization data and/or memory utilization data in each sub-time window.

6. The method according to claim 1, wherein based on the standard deviation of the data in the at least two sub-time windows and/or variation information of the data in the first monitoring time window, the status of the first application is determined as being the online status further in response to the standard deviation of CPU utilization data and/or memory utilization data in each sub-time window being greater than a first threshold, the first threshold being based on corresponding historical standard deviation.

7. The method according to claim 1, further comprising:

determining the period based on the application type of the first application.

8. The method according to claim 7, wherein the period is 24 hours in response to the first application corresponding to an email or office software package, and the period is one month in response to the first application corresponding to a financial close system.

9. A non-transitory computer-readable storage medium storing instructions that, when executed by at least one processor, cause the at least one processor to perform a method for data processing, the method comprising:

determining whether a first application deployed in a cloud platform satisfies a first condition, wherein the determining whether the first application satisfies the first condition includes: determining whether the first application satisfies a first sub-condition included in the first condition and a second sub-condition included in the first condition, the first sub-condition being indicative of a resource or a first data of the first application in the cloud platform not having been delivered;

determining whether a monitoring system corresponding to the first application is activated;

in response to the first application satisfying the first condition and the monitoring system corresponding to the first application being not activated, obtaining central processing unit utilization data and/or memory utilization data, of a server corresponding to the first application in the cloud platform, within a first monitoring time window;

determining a standard deviation of the central processing unit utilization data and/or the memory utilization data in at least two sub-time windows included in the first monitoring time window;

based on the standard deviation of the central processing unit utilization data and/or the memory utilization data in the at least two sub-time windows and/or variation information of the central processing unit utilization data and/or the memory utilization data in the first monitoring time window, determining whether a status of the first application is an online status, wherein the status of the first application is determined as being the online status in response to the central processing unit utilization data and/or the memory utilization data in the first monitoring time window changing periodically based on a period, the period being associated with an application type of the first application; and in response to the status of the first application being the online status, sending warning information, the warning information prompting activation of the monitoring system corresponding to the first application.

10. The non-transitory computer-readable storage medium according to claim 9, wherein the first application is determined as satisfying the first sub-condition in response to the first application satisfying at least one of: a delivery time of the resource corresponding to the first application in a delivery database being after a first moment, an application time of the resource corresponding to the first application in a cloud platform being after a second moment, a time of creating the resource corresponding to the first application in the cloud platform being after a third moment, or a time of generating the resource corresponding to the first application in the cloud platform being after a fourth moment.

11. The non-transitory computer-readable storage medium according to claim 9, wherein the first application is determined as satisfying the second sub-condition in response-to a current status of the first application being an online deployment status.

12. An electronic device comprising:

one or more processors; and one or more memories communicatively connected to the one or more processors and storing instructions that, when executed by the one or more processors, cause the one or more processors to:

determine whether a first application deployed in a cloud platform satisfies a first condition, wherein to determine whether the first application satisfies the first condition, the one or more processors are further configured to: determine whether the first application satisfies a first sub-condition included in the first condition and a second sub-condition included in the first condition, the first sub-condition being indicative of a resource or a first data of the first application in the cloud platform not having been delivered;

determine whether a monitoring system corresponding to the first application is activated;

in response to the first application satisfying the first condition and the monitoring system corresponding the first application being not activated, obtain central processing unit utilization data and/or memory utilization data, of a server corresponding to the first application in the cloud platform, within a first monitoring time window;

determine a standard deviation of the central processing unit utilization data and/or the memory utilization data in at least two sub-time windows included in the first monitoring time window;

based on the standard deviation of the central processing unit utilization data and/or the memory utilization data in the at least two sub-time windows and/or variation information of the central processing unit utilization data and/or the memory utilization data in the first monitoring time window, determine whether a status of the first application is an online status, wherein the status of the first application is determined as being the online status in response to the central processing unit utilization data and/or the memory utilization data in the first monitoring time window changing periodically based on a period, the period being associated with an application type of the first application; and in response to the status of the first application being the online status, send warning information, the warning information prompting activation of the monitoring system corresponding to the first application.

13. The device according to claim 12, wherein the first application is determined as satisfying the first sub-condition in response to the first application satisfying at least one of: a delivery time of a resource corresponding to the first application in a delivery database being after a first moment, an application time of the resource corresponding to the first application in a cloud platform being after a second moment, a time of creating the resource corresponding to the first application in the cloud platform being after a third moment, or a time of generating the resource corresponding to the first application in the cloud platform being after a fourth moment.

14. The device according to claim 12, wherein the first application is determined as satisfying the second sub-condition in response to a current status of the first application being an online deployment status.

15. The device according to claim 12, wherein the one or more processors are further configured to:

determine a starting point and an ending point of the first monitoring time window; and obtain central processing unit (CPU) utilization data and/or memory utilization data between the starting point and the ending point.

16. The device according to claim 12, wherein the one or more processors are further configured to:

divide the first monitoring time window into at least two sub-time windows of an equal length; and determine a standard deviation of CPU utilization data and/or memory utilization data in each sub-time window.

17. The device according to claim 12, wherein the status of the first application is determined as being the online status further in response to the standard deviation of CPU utilization data and/or memory utilization data in each sub-time window being greater than a first threshold, the first threshold being based on corresponding historical standard deviation.

* * * * *